US009185576B2

(12) United States Patent
Sorrentino

(10) Patent No.: US 9,185,576 B2
(45) Date of Patent: Nov. 10, 2015

(54) METHOD AND DEVICE FOR HANDLING BASE SEQUENCES IN A COMMUNICATIONS NETWORK

(75) Inventor: Stefano Sorrentino, Solna (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 187 days.

(21) Appl. No.: 13/577,245

(22) PCT Filed: Jun. 29, 2012

(86) PCT No.: PCT/SE2012/050749
§ 371 (c)(1), (2), (4) Date: Aug. 4, 2012

(87) PCT Pub. No.: WO2013/002726
PCT Pub. Date: Jan. 3, 2013

(65) Prior Publication Data
US 2013/0072241 A1   Mar. 21, 2013

Related U.S. Application Data

(60) Provisional application No. 61/503,102, filed on Jun. 30, 2011.

(51) Int. Cl.
*H04W 24/02* (2009.01)
*H04L 25/02* (2006.01)
*H04L 5/00* (2006.01)

(52) U.S. Cl.
CPC .............. *H04W 24/02* (2013.01); *H04L 5/0073* (2013.01); *H04L 25/0224* (2013.01); *H04L 5/0035* (2013.01); *H04L 5/0048* (2013.01); *H04L 5/0053* (2013.01); *H04L 25/0226* (2013.01)

(58) Field of Classification Search
CPC . H04L 27/2613; H04L 5/0048; H04L 5/0051; H04L 5/0023; H04B 7/0452; H04W 88/02; H04W 88/08
See application file for complete search history.

(56) References Cited

U.S. PATENT DOCUMENTS 8,326,307 B2 * 12/2012 Arad et al. ............... 455/446
2007/0087772 A1 * 4/2007 Yi et al. .................... 455/522
(Continued)

FOREIGN PATENT DOCUMENTS

EP   2464163 A1   6/2012
JP   2009-10659 A   1/2009
(Continued)

OTHER PUBLICATIONS

EPO, Int'l Search Report in PCT/SE2012/050749, Oct. 15, 2012.
(Continued)

*Primary Examiner* — Bobbak Safaipour
(74) *Attorney, Agent, or Firm* — Patent Portfolio Builders PLLC

(57) ABSTRACT

The embodiments herein relate to a method in a network node (103), a network node (103), a method in a user equipment (105) and a user equipment for handling base sequences in a communications network (100). The network node (103) is configured to communicate with a first user equipment (105). The network node (103) comprises information about a default base sequence and an alternative base sequence. The network node (103) determines (405, 505, 901), for the first user equipment (105), that the alternative base sequence should replace the default base sequence. The network node (103) sends (406, 506, 902) information about the determined alternative base sequence to the first user equipment (105).

17 Claims, 11 Drawing Sheets

(56) References Cited

U.S. PATENT DOCUMENTS

| | | | |
|---|---|---|---|
| 2007/0223606 A1* | 9/2007 | Yang et al. | 375/260 |
| 2008/0075185 A1* | 3/2008 | Park et al. | 375/260 |
| 2008/0076407 A1* | 3/2008 | Shitara | 455/424 |
| 2009/0059859 A1* | 3/2009 | Kuze et al. | 370/329 |
| 2009/0116449 A1* | 5/2009 | Kishiyama et al. | 370/331 |
| 2009/0186621 A1* | 7/2009 | Umeda et al. | 455/446 |
| 2011/0267972 A1* | 11/2011 | Yoon et al. | 370/252 |
| 2013/0279544 A1* | 10/2013 | Papasakellariou et al. | 375/146 |
| 2013/0308588 A1* | 11/2013 | Jongren et al. | 370/329 |
| 2013/0322229 A1* | 12/2013 | Yoon et al. | 370/208 |

FOREIGN PATENT DOCUMENTS

| | | |
|---|---|---|
| JP | 2010-199902 A | 9/2010 |
| WO | 2009/157723 A2 | 12/2009 |
| WO | 2010/011083 A2 | 1/2010 |

OTHER PUBLICATIONS

Huawei, Considerations on the Uplink Reference Signal for CoMP, Tdoc R1-091267, Mar. 23, 2009, 3GPP TSG RAN WG1 Meeting 56bis, Seoul, KR.

Nokia Siemens Networks et al., Uplink DM RS from CoMP Viewpoint, Tdoc R1-091760, May 4, 2009, 3GPP TSG RAN WG1 Meeting 57, San Francisco, US.

Nokia Siemens Networks et al., UL CoMP Performance w/o Inter-Cell Orthogonal Reference Signal, Tdoc R1-111739, May 9, 2011, 3GPP TSG RAN WG1 Meeting 65, Barcelona, ES.

Japanese Office Action in corresponding Japanese Application No. 2014-518501 mailed Nov. 28, 2015.

Office Action in corresponding European Application No. 12 743 249.0, dated Jul. 30, 2015.

Motorola; "R1-072684: Uplink Reference Signal Planning Aspects"; Agenda Item: 5.11.2; 3GPP TSG RAN1 #49bis; Jun. 25-29, 2007; pp. 1-11; Orlando, FL.

* cited by examiner

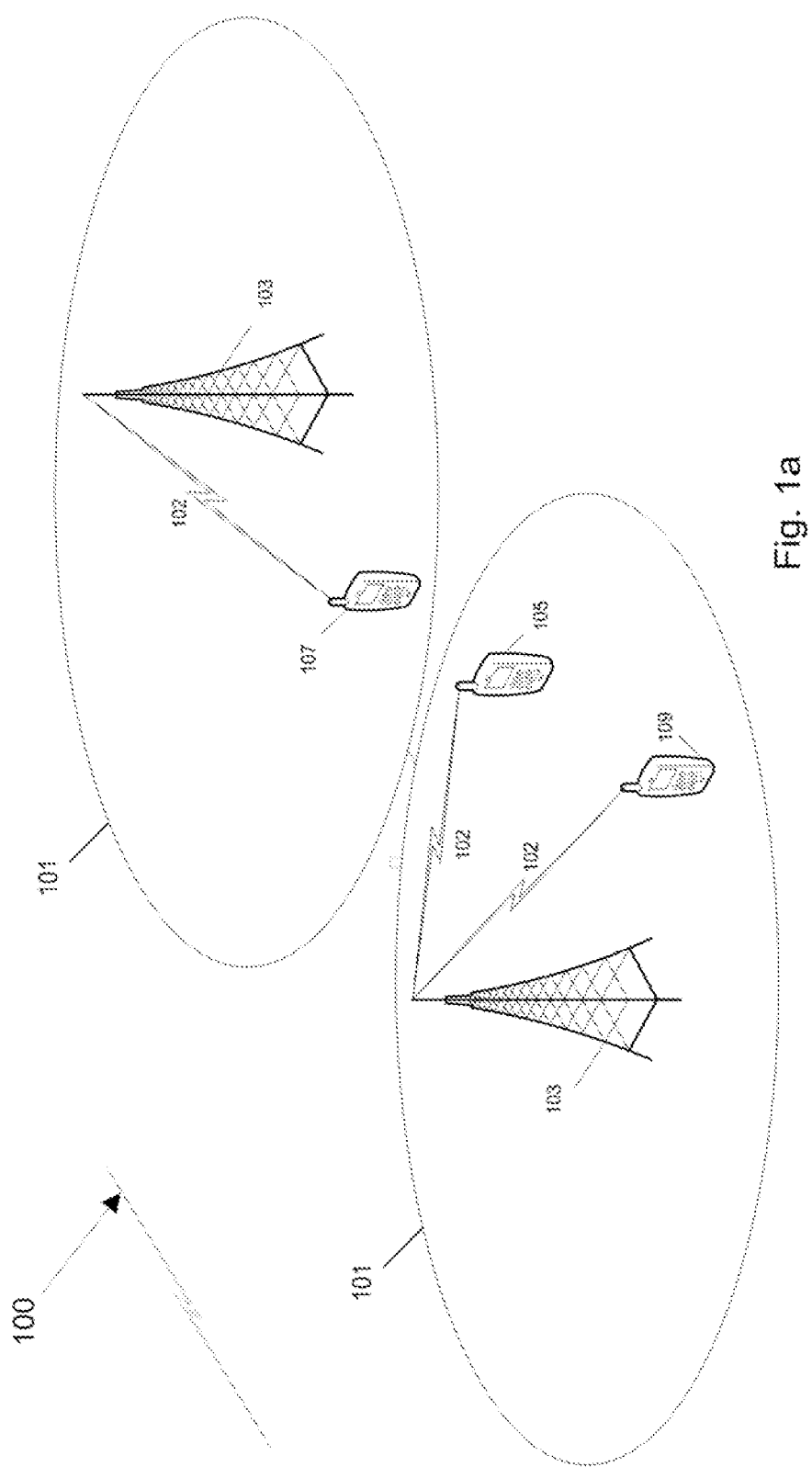

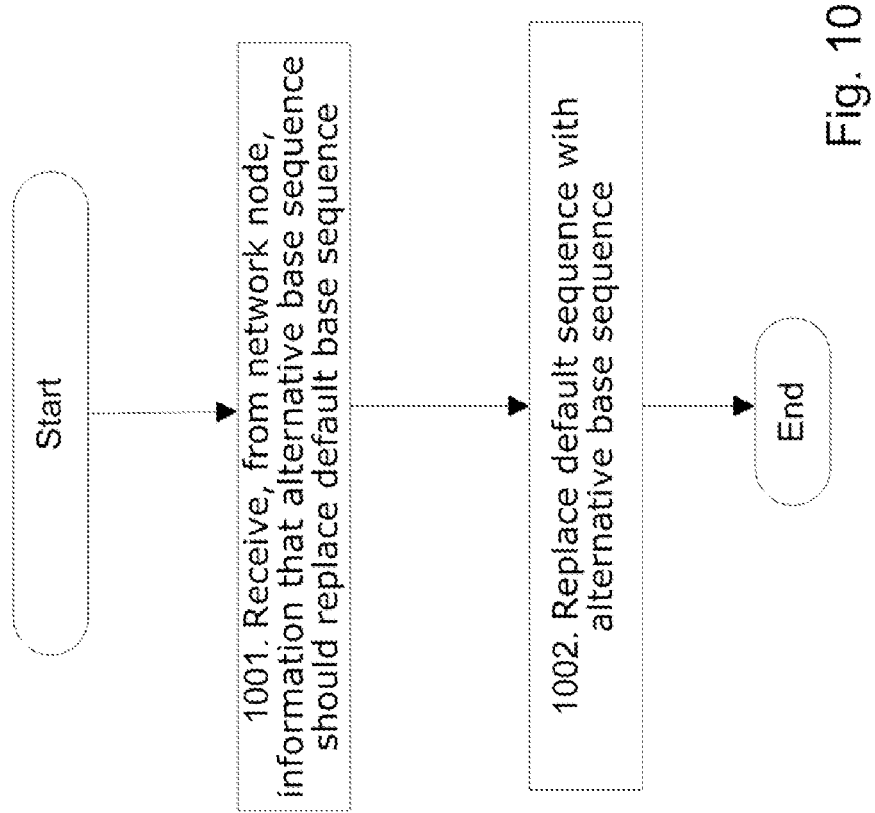

METHOD AND DEVICE FOR HANDLING BASE SEQUENCES IN A COMMUNICATIONS NETWORK

TECHNICAL FIELD

Embodiments herein relate generally to a network node and a method in the network node, and to a user equipment and a method in the user equipment. More particularly the embodiments herein relate to handling base sequences in a communications network.

BACKGROUND

In a typical cellular network, also referred to as a communication system or wireless communication system, User Equipments (UEs), communicate via a Radio Access Network (RAN) to one or more core networks (CNs).

A user equipment is a mobile terminal by which a subscriber may access services offered by an operator's core network and services outside operator's network to which the operator's RAN and CN provide access. The user equipments may be for example communication devices such as mobile telephones, cellular telephones, or laptops with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wired or wirelessly in the communications network. The communication may be performed e.g. between two user equipments, between a user equipment and a regular telephone and/or between the user equipment and a server via the radio access network and possibly one or more core networks, comprised within the cellular network.

The communications network covers a geographical area which is divided into cell areas. Each cell area is served by a Base Station (BS), e.g. a Radio Base Station (RBS), which sometimes may be referred to as e.g. "eNB", "eNodeB", "NodeB", "B node", or Base Transceiver Station (BTS), depending on the technology and terminology used. A "cell" is characterized in e.g. Long Term Evolution (LTE) by a "cell-ID", which affects several cell-specific algorithms and procedures.

The base stations may be of different classes such as e.g. macro eNodeB, home eNodeB or pico base station, based on transmission power and thereby also on cell size.

The base station communicates, over radio carriers or channels, with one or more user equipment(s) using a radio access technology, such as e.g. LTE, LTE Advanced, Wideband Code Division Multiple Access (WCDMA), Global System for Mobile Communications (GSM), or any other Third Generation Partnership Project (3GPP) radio access technology. LTE is used as an example in the following description.

When the base station receives, at its antenna(s), signals from a plurality of user equipments, it may use different reception techniques for demodulation. Two different reception techniques for demodulating the symbols from multiple user equipments in each cell are Successive Interference Cancellation (SIC) and Interference Rejection Combining (IRC). Both of these reception techniques require a baseband receiver, at the base station, to estimate the channel between each user equipment and each base station antenna. Baseband refers to signals and systems whose range of frequencies is measured from close to 0 hertz to a cut-off frequency, a maximum bandwidth or highest signal frequency. Baseband may also be used as a noun for a band of frequencies starting close to zero. The quality of the channel estimates greatly influences the performance of both SIC and IRC.

The base station may comprise multiple antennas, and the base station may receive signals from a user terminal at the multiple antennas. To receive a signal from a specific user equipment, the base station determines the set of base station antennas that will be used to receive the signal transmitted from the user equipment. The signals received by this set of antennas are sent to an "uplink receiver" that demodulates the signal transmitted by the user equipment. Note that the same set of antennas could be used for the reception of multiple user equipments. The uplink receiver typically estimates the uplink channels between each user equipment and base station antenna using reference signals that are transmitted from each user equipment on the uplink. When the base station estimates the uplink channel from a particular user equipment, the reference signals from other user equipments in the network act as interference and degrade the accuracy of the channel estimation. Therefore, it is generally desirable that the reference signals from all the user equipments are mutually orthogonal. In an LTE system, given one reference signal spanning consecutive subcarriers, a second orthogonal reference signal spanning the same subcarriers may be generated by adding a linear phase rotation to the same base reference signal. By using different phase rotations for different user equipments, a large number of mutually orthogonal reference signals spanning the same subcarriers may be generated.

The communication between a base station and a user equipment may be structured in different ways, depending on the technology which is used. For example, in LTE, the communication is structured in frames and subframes. One type of LTE frame, i.e. Time Division Duplex (TDD) mode, has an overall length of 10 ms. The frame is divided into 20 individual slots. A subframe comprises two slots, i.e. there are ten subfames within a frame. Another type of an LTE frame, i.e. Frequency Division Duplex (FDD) mode, comprises two half frames, each having an overall length of 5 ms. And each half frame is split into five subframes, each 1 ms long.

An LTE communications network is designed to support user equipments from different releases, i.e., Rel-8/9/10/11, in a backward compatible way. One of the LTE network design objective is to enable co-scheduling of such user equipments in time, frequency and space, i.e. Multi-User Multiple Input Multiple Output (MU-MIMO), dimensions with as few scheduling constraints as possible.

Furthermore, the LTE standard should be able to support various and flexible deployments. Some examples of expected deployments for modern LTE networks, i.e. Rel-11 and beyond, comprise, e.g., Macro-deployments, where large cells are typically divided into independent sectors.

Hetrogenous Networks (HetNet)-deployments, where pico-cells are deployed within the coverage of macro-cell in order, e.g., to improve coverage for high data rate user equipments.

Hotspot scenarios where an access point serves a small area with high throughput need.

In addition, LTE networks are designed with the aim of enabling optional Coordinated Multipoint Processing (CoMP) techniques, where different sectors and/or cells operate in a coordinated way in terms of, e.g., scheduling and/or processing. An example is uplink CoMP where the signal originating from a single user equipment is typically received at multiple reception points and jointly processed in order to improve the link quality. Uplink joint processing, also referred to as uplink CoMP, allows transformation of what is regarded as inter-cell interference in a traditional deployment into a useful signal. Therefore, LTE networks taking advantage of uplink CoMP may be deployed with smaller cell size compared to traditional deployments in order to fully take advantage of the CoMP gains.

The uplink of LTE is designed assuming coherent processing, i.e., the receiver is able to estimate the radio channel from a transmitting user equipment and to take advantage of such information in a detection phase, i.e. in demodulation of a received signal. Therefore, each transmitting user sends a Reference Signal (RS) associated to each uplink data channel, i.e. Physical Uplink Shared Channel (PUSCH). The reference signal may also be called pilot signal and are inserted in the transmitted signal. The reference signals are sent fairly often as the channel conditions change due to fast fading and other changes.

Each reference signal is characterized by a group-index and a sequence-index. The reference signal is derived from a base sequence. Cyclic shift may be used for deriving the reference signal from the base sequence. In other words, multiple reference signal sequences are defined from each base sequence.

Base sequences are cell-specific in Rel-8/9/10 and they are a function of the cell-ID. Different base sequences are semi-orthogonal. The reference signal for a given user equipment is only transmitted on the same bandwidth of PUSCH, and the base sequence is correspondingly generated so that the reference signal is a function of the PUSCH bandwidth. For each subframe, two reference signals are transmitted, one per slot.

There are two types of uplink reference signals: a demodulation reference signal (DMRS) and a Sounding Reference Signal (SRS). The demodulation reference signal is used for channel estimation for data demodulation, and the sounding reference signal is used for user scheduling.

Reference signals from different user equipments within the same cell potentially interfere with each other and, assuming synchronized networks, even with reference signals originated by user equipments in neighboring cells. In order to limit the level of interference between reference signals different techniques have been introduced in different LTE releases in order to allow orthogonal or semi-orthogonal reference signals. The design principle of LTE assumes orthogonal reference signals within each cell and semi-orthogonal reference signals among different cells, even though orthogonal reference signals may be achieved for aggregates of cells by so called "sequence planning".

Orthogonal reference signals may be achieved by use of Cyclic Shift (CS) in Rel-8/9 or by CS in conjunction with Orthogonal Cover Codes (OCC) in Rel-10. It is assumed that CS and OCC may also be supported by Rel-11 user equipments.

Cyclic shift is a method to achieve orthogonality based on cyclic time shifts, under certain propagation conditions, among reference signals generated from the same base sequence. Only eight different cyclic shift values may be indexed in Rel-8/9/10, even though in practice less than eight orthogonal reference signals may be achieved depending on channel propagation properties. Even though cyclic shift is effective in multiplexing reference signals assigned to fully overlapping bandwidths, orthogonality is lost when the bandwidths differ and/or when the interfering user equipments employ another base sequence.

OCC is a multiplexing technique based on orthogonal time domain codes, operating on the two reference signals provided for each uplink subframe. The OCC code [1-1] is able to suppress an interfering reference signal as long as its contribution after the base station matched filter is identical on both reference signals of the same subframe. Similarly, the OCC code [1 1] is able to suppress an interfering reference signal as long as its contribution after the base station matched filter has an opposite sign respectively on the two reference signals of the same subframe. The matched filter will be described in more detail below.

While base sequences are assigned in a semi-static fashion, CS and OCC are user equipment specific and dynamically assigned as part of the scheduling grant for each uplink PUSCH transmission.

Even though joint processing techniques may be applied for PUSCH, channel estimates based on reference signals are typically performed in an independent fashion at each reception point, even in case of uplink CoMP. Therefore, it is crucial to keep the interference level at an acceptably low level, especially for the reference signals.

In order to minimize the impact of burst interference peaks on reference signals, interference randomization techniques have been introduced in LTE. In particular:

Cyclic shift randomization is always enabled and generates random cell-specific cyclic shift offsets per slot. The pseudo-random CS pattern is a function of the base sequence index and the cell-ID and is thus cell-specific.

Sequence hopping and Group Hopping (SGH) are base sequence index randomization techniques which operate on a slot level with a cell-specific pattern, which is a function of the cell-ID and sequence index.

For Rel-8/9 user equipments, SGH may be enabled/disabled on a cell-basis.

For Rel-10 user equipments, SGH may be enabled in a user equipment specific fashion.

In the uplink for LTE Rel-10 multi-antenna techniques which may significantly increase the data rates and reliability of a communication system is introduced. The performance is in particular improved if both the transmitter and the receiver are equipped with multiple antennas. This result in a MIMO communication channel and such systems and/or related techniques are referred to as MIMO.

LTE Rel.10 supports a spatial multiplexing mode, i.e. Single User-MIMO (SU-MIMO), in the communication from a single user equipment to the base station. SU-MIMO is aimed for high data rates in favorable channel conditions. SU-MIMO comprises the simultaneous transmission of multiple data streams on the same bandwidth, where each data stream is usually termed as a layer. Multi-antenna techniques such as linear precoding are employed at the transmitter in order to differentiate the layers in the spatial domain and allow the recovering of the transmitted data at the receiver side.

Another MIMO technique supported by LTE Rel.10 is MU-MIMO, where multiple UEs belonging to the same cell are completely or partly co-scheduled on the same bandwidth and time slots. Each UE in the MU-MIMO configuration may possibly transmit multiple layers, thus operating in SU-MIMO mode.

In case of SU-MIMO it is necessary to allow the receiver to estimate the equivalent channel associated to each transmitted layer of each user equipment in order to allow detection of all the data streams. In case of CoMP, such requirement applies also to user equipments belonging to other cells but comprised in the joint processing cluster. Therefore, each user equipment need to transmit a unique reference signal at least for each transmitted layer. The base station receiver is aware of which reference signal is associated to each layer and performs estimation of the associated channel by performing a channel estimation algorithm. The estimated channel is then employed by the receiver in the detection process.

In case of MU-MIMO, user equipments may be scheduled on fully or partially overlapping bandwidths. Some typical application cases are exemplified in the following:

MU-MIMO within a cell, fully overlapping bandwidth: in this case the reference signals of the different user equipments may be multiplexed by means of CS and/or OCC. Furthermore, SGH may be enabled without affecting orthogonality.

MU-MIMO within a cell, partly overlapping bandwidth: in this case the reference signals of the different user equipments may be multiplexed by means of OCC only and SGH cannot be enabled for any of the user equipments.

MU-MIMO of user equipments belonging to different cells, e.g., in a CoMP application,: in this case the user equipments are typically assigned different base sequences and orthogonality may not be achieved, due to the different CS hopping patterns.

The deployments described above and the extensive use of uplink CoMP require scheduling flexibility and improved channel estimation quality, even for geographically far away user equipments belonging to another cell. Assuming, e.g., a HetNet deployment, the small cell radius of the picocell and the geographic location within the macrocell coverage implies the presence of potentially strong interference between user equipments belonging to such cells. Densifications of the cells, increasing number of receive antennas and optional CoMP processing, on the other hand, emphasizes the need for flexible MU-MIMO scheduling. In the scenarios described above, disabling SGH will enhance the risk of inter-cell interference peaks.

SUMMARY

The presence of a mix of multiple user equipments from Rel-8/9/10 and beyond in the same network emphasizes the need to seamlessly co-schedule such user equipments, independently of their specific release. However, MU-MIMO is not efficient in Rel-8/9/10 in conjunction with sequence and group hopping (SGH) if the paired user equipments are assigned different base sequences, because neither orthogonal cover codes (OCC) nor cyclic shifts (CS) are effective in such scenario and only semi-orthogonality may be achieved.

As an example, consider a case where two user equipments UE1 and UE2 are co-scheduled on the same bandwidth and consider that UE1 and UE2 belong to different cells and are not assigned the same base sequence. An example is that UE1 belongs to a macro-cell and UE2 to a pico-cell in a hetnet LTE scenario. Since the base sequences associated respectively to S1 and S2 are different, orthogonality between the UEs is not possible with consequent performance degradation due to cell-edge interference.

A solution may be to disable SGH in a user equipment specific way for some of the Rel-10 user equipments. However, SGH may only be disabled in a cell-specific way for Rel-8/9 user equipment, implying cell-specific SGH disabling even for Rel-10 user equipments, with severe degradation of inter-cell interference.

Another solution may be to assign the same base sequence, and consequently SGH pattern, to interfering cells such as, e.g., the macrocell and the picocells within the macrocell coverage. However, problems are associated with such a solution such as, e.g., reduced SGH randomization, unpredictably large interference peaks generated when user equipments with the same base sequence are scheduled on partly overlapping bandwidths and DeModulation Reference Sequence (DMRS) capacity limitations, only CS and OCC may be employed for orthogonalizing DMRS over the aggregated cells.

An objective of embodiments herein is therefore to obviate at least one of the above disadvantages and to provide improved channel estimation in a communications network.

According to a first aspect, the objective is achieved by a method in a network node for handling base sequences in a communications network. The network node is configured to communicate with a first user equipment. The network node comprises information about a default base sequence and an alternative base sequence. The network node determines, for the first user equipment, that the alternative base sequence should replace the default base sequence. The network node sends information about the determined alternative base sequence to the first user equipment.

According to a second aspect, the objective is achieved by a method in a first user equipment for handling base sequences in a communications network. The first user equipment is configured to communicate with a network node. The first user equipment employs a default base sequence. The user equipment receives, from the network node, information that an alternative base sequence should replace the default base sequence. The user equipment replaces the default base sequence with the alternative base sequence.

According to a third aspect, the objective is achieved by a network node for handling base sequences in a communications network. The network node is configured to communicate with a first user equipment. The network node comprises information about a default base sequence and an alternative base sequence. The network node further comprising a determining unit which is configured to determine, for the first user equipment, that the alternative base sequence should replace the default base sequence. The network node comprises a sending unit configured to send information about the determined alternative base sequence to the first user equipment.

According to a fourth aspect, the objective is achieved by a user equipment for handling base sequences in a communications network. The user equipment is configured to communicate with a network node. The user equipment employs a default base sequence. The user equipment comprises a receiving unit configured to receive, from the network node, information that an alternative base sequence should replace the default base sequence. The user equipment further comprises a processing unit configured to replace the default base sequence with the alternative base sequence.

Embodiments herein afford many advantages, of which a non-exhaustive list of examples follows:

One or some embodiment(s) herein provide the advantage of providing a marginal complexity and allowing reuse of the sequence and group hopping (SGH) sequences implemented in Rel-8/9/10 UEs.

Furthermore, one or some embodiment(s) herein provide the advantage of reducing interference of reference signals by enabling SGH for MU-MIMO.

Further, one or some embodiment(s) herein provide the advantage of improved scheduling flexibility for MU-MIMO.

At least one of the embodiments herein provide the advantage of allowing MU-MIMO between user equipments of different releases without disabling SGH, e.g. between Rel-11 LTE user equipments and user equipments from previous LTE releases.

An even further embodiment is that orthogonality between the user equipments is possible without consequent performance degradation due to cell-edge interference.

Some embodiments herein minimize signalling overhead and preserve flexibility in scheduling allocation.

The embodiments herein are not limited to the features and advantages mentioned above. A person skilled in the art will recognize additional features and advantages upon reading the following detailed description.

Introduction of the alternative base sequence which may be dynamically triggered by scheduling grants enables achieving improved RS orthogonality of Rel-11 user equipments with either Rel-8/9/10/11 UE. Whenever a switch to an alternative base sequence is indicated, all the base-sequence specific parameters, e.g., hopping offsets for SGH and CS hopping, are correspondingly dynamically adjusted. By choosing the alternative sequence properly, e.g., for a CoMP setting, it is possible to allow perfect or at least close to perfect RS orthogonality of Rel-11 user equipments with Rel-8/9/10 and Rel-11 user equipment(s). Differently from prior art, orthogonality is thereby achieved both when SGH is enabled and disabled for the Rel-8/9/10 user equipment.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIGS. 1 and 1a each show a schematic block diagram illustrating embodiments of a communications network.

FIG. 10 is a flow chart illustrating embodiments of a method in a user equipment.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
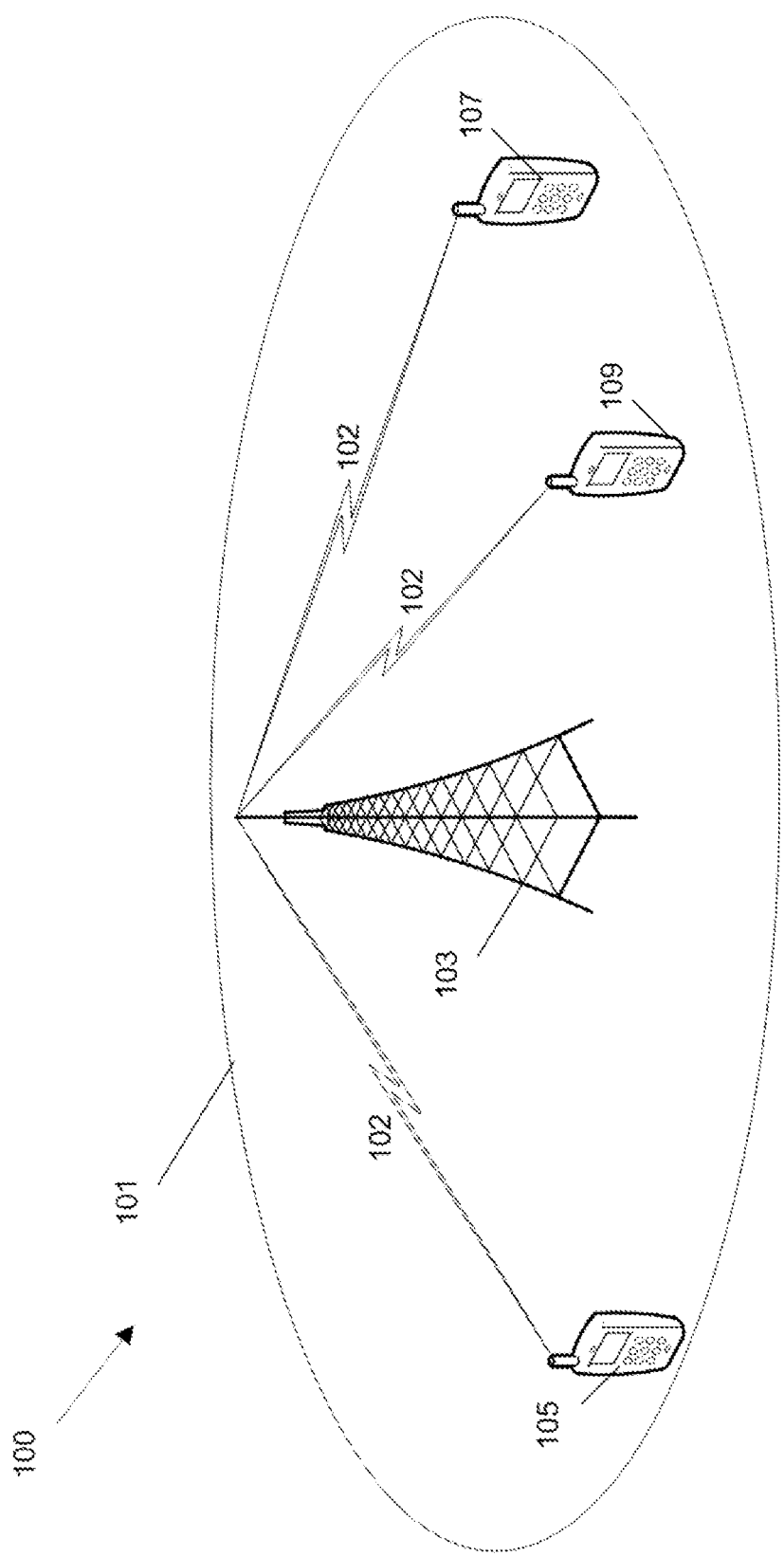

FIG. 1 and FIG. 1a each depict a communications network 100 in which embodiments herein relating to signaling of demodulation reference signal (DMRS) patterns for multicell scenarios such as for a CoMP network of cells, may be implemented. The communications network 100 may in some embodiments apply to one or more radio access technologies such as for example LTE, LTE Advanced, WCDMA, GSM, or any other 3GPP radio access technology.

The communications network 100 comprises network nodes such as e.g. a base station 103 serving a cell 101. The base station 103 may be a base station such as a Radio Base Station, NodeB, an evolved NodeB (eNB), depending on the technology and terminology used, or any other network unit capable to communicate over a radio carrier 102 with a first user equipment 105 being present in the cell 101. The radio carrier 102 may also be referred to as carrier, radio channel, channel, communication link, radio link or link. The base station 103 may be of different classes, for example a macro base station, such as for example a eNodeB, or a low power base station, such as for example a home eNodeB, pico base station, or femto base station, based on transmission power and thereby also on cell size. Even though FIGS. 1 and 1a show the base station 103 serving one cell 101, the base station 103 may serve two or more cells 101. The communications network 100 may further comprise a second user equipment 107 and a third user equipment 109. In some embodiments, the second user equipment 107 and the third user equipment 109 are present in the same cell 101 as first user equipment 105 and served by the same base station 103. In other embodiments, the first and third user equipment 105, 109 are located in one cell and the second user equipment 107 is located in another cell but they may still belong to the same CoMP scheduling cluster, i.e. they are located in neighbour cells (FIG. 1a).

The communications network 100 may be divided into cells, such as e.g. the cells 101. The use of cells is the reason why a communications network 100 may be referred to as a cellular communications network. A cell is a geographical area where the base station 103 which serves the cell 101, provides radio coverage to user equipments 105 present in the cell 101. A cell 101 may be of different size such as e.g. a micro cell which typically covers a limited area, a pico cell which typically covers a small area, a femto cell which is typically designed for use in a home or small business or a macrocell which typically provides coverage larger than a microcell.

The user equipment 105 present within the cell 101 and served by the base station 103 is in this case capable of communicating with the base station 103 over the radio carrier 102. A data stream(s) is communicated between the base station 103 and the user equipment(s) 105 over the radio channel 102 in a layered approach. Examples of layers are physical layer, data link layer, network layer, transport layer, session layer, etc.

The user equipment 105 may be any suitable communication devices or computational devices with communication capabilities capable to communicate with the base station 103 over the radio channel 102, for instance but not limited to mobile phone, smart phone, personal digital assistant (PDA), laptop, MP3 player or portable DVD player (or similar media content devices), digital camera, or even stationary devices such as a PC. A PC may also be connected via a mobile station as the end station of the broadcasted/multicast media. The user equipment 105 may be embedded communication devices in e.g. electronic photo frames, cardiac surveillance equipment, intrusion or other surveillance equipment, weather data monitoring systems, vehicle, car or transport communication equipment, etc. The user equipment 105 is referred to as UE in some of the figures. Only one user equipment 105 is illustrated in FIG. 1 and FIG. 1a for the sake of simplicity; however the respective base station 103 may serve a set of plural user equipments 105.

It should be noted that the radio carrier 102 between the base station 103 and the user equipment 105 may be of any suitable kind comprising either a wired or wireless link. The carrier 102 may use any suitable protocol depending on type and level of layer, e.g. as indicated by the Open Systems Interconnection (OSI) model, as understood by the person skilled in the art.

The following description uses an UpLink (UL) transmission path of an LTE Rel-11 network as an example, even though it may be applied even to the Down Link (DL) and to other communication protocols, such as e.g. the ones mentioned above. The uplink (UL) is the link from the user equipment to the base station, and downlink (DL) is the link from the base station to the user equipment.

Figure 2:
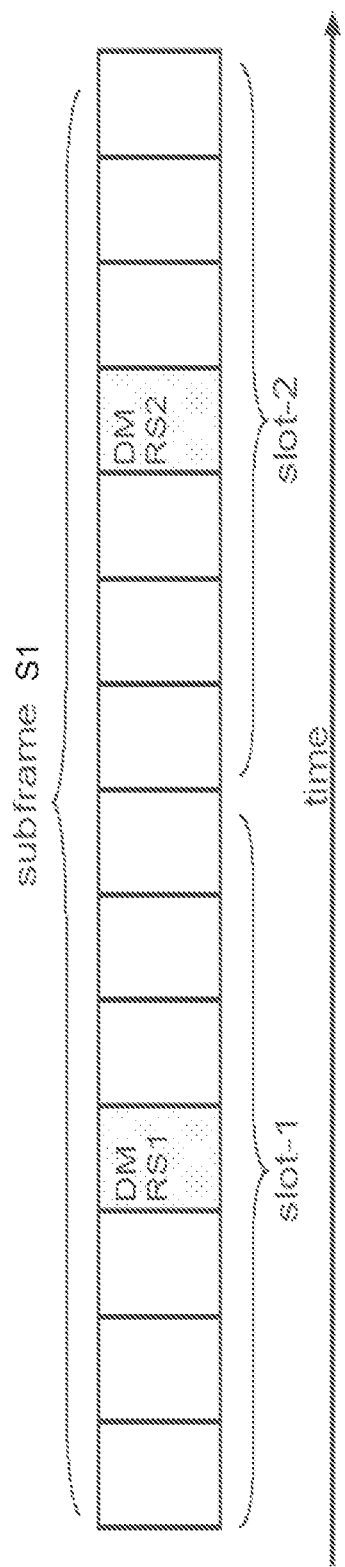
FIG. 2 is a schematic block diagram illustrating embodiments of a UL-DMRS subframe for UE1.

Consider a subframe, S1, transmitted by a first user equipment UE1 based on LTE Rel-8/9/10 and provided with two DMRS, respectively one per slot, as illustrated in FIG. 2. FIG. 2 represents a single transmission layer for UL-DMRS subframe for the first user equipment, UE1. DMRS may also be referred to as reference signals (RS). Without loss of generality, in the following a time-domain representation of the signals is provided, but equivalent principles may be applied for frequency-domain processing. The x-axis of FIG. 2 illustrates time in, for examples, seconds. Let $s_1$ be the DMRS base sequence for slot-1 and $s_2$ the DMRS base sequence for slot-2. In the case of multi-antenna transmission.

Figure 3:
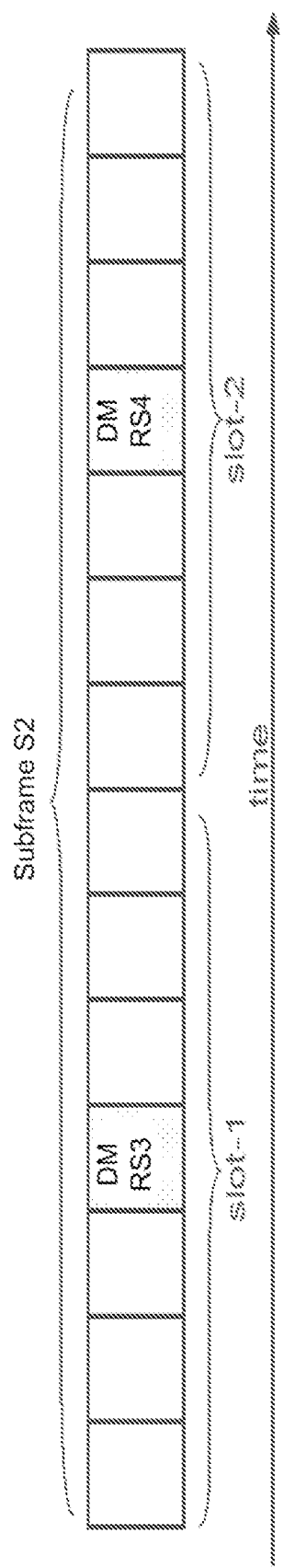
FIG. 3 is a schematic block diagram illustrating embodiments of a UL-DMRS subframe for UE2.

Consider now a second LTE subframe, S2, as illustrated in FIG. 3, where the DMRS base sequences for the two slots are respectively s3 and s4. The second LTE subframe, S2, is transmitted by a second LTE user equipment, UE2. FIG. 3 illustrating the uplink DMRS subframe for the second user equipment UE2 has an x-axis representing time, in for examples seconds.

Assuming that SGH is enabled, subframes S1 and S2 having different base-sequences on both slots, where s1, s2, s3 and s4 are semi-orthogonal base-sequences pseudo-randomly chosen from a set of predefined base sequences.

Then consider a case where the two user equipments UE1 and UE2 respectively are co-scheduled on the same bandwidth e.g. let UE 1=first user equipment 105 and UE2=second user equipment 107. Further, as an example, consider that UE1 and UE2 belong to different cells (e.g. see FIG. 1a) and are not assigned the same base sequence. An example is that UE1 belongs to a macro-cell and UE2 to a pico-cell in a hetnet LTE scenario. Since the base sequences associated respectively to subframe S1 for UE1 and subframe S2 for UE2 are different, orthogonality between the UEs is not possible with consequent performance degradation occurring due to cell-edge interference.

Co-scheduling user equipments on the same time-frequency resource block is a technique that is used to make more efficient use of the available resources in a communications network. The embodiments herein may be applied to an arbitrary number of co-scheduled user equipments from any LTE releases although for simplicity the above example involves the two co-scheduled user equipments UE1 and UE2.

The above problem is solved with the herein described embodiments by optionally switching the base sequence employed by certain UEs in a cell from the cell-specific base sequence set per default to a different base-sequence, i.e. an alternative base sequence, which is a UE specific base sequence. The alternative base sequence is configured per UE dependent on interference situation. That is, if one or more UEs of a cell is(are) interfered by a neighbour cell, or would possibly interfere one another in the same cell if given different base sequences in case of an MU-MIMO scenario, then these UEs of the cell are assigned an alternative base sequence, which thus becomes "UE specific" as not being dependent on the cell specific parameters of the serving cell, which is the case for the default cell specific base sequence.

In one typical embodiment configuration, the alternative base sequence matches the default base sequence for a neighbouring cell (including the base sequence randomization of SGH and CS hopping). For the above described example, the alternative base sequence for UE1 would then be the default base sequence used in the neighbour cell i.e. the default base sequence used by UE2.

The embodiments herein introduce using an alternative base sequence, which may be dynamically triggered or activated by way of scheduling grants. An index of the alternative base sequence may be indicated or configured in a semi-static way, e.g. by RRC higher layer signaling. This provides that the signaling overhead required for dynamically indicating the selected base sequence is minimized and flexibility in scheduling allocation is preserved.

Whenever a switching to an alternative base sequence is triggered, all the base-sequence specific parameters, e.g., hopping offsets for SGH and CS hopping, are correspondingly dynamically adjusted.

By choosing the alternative sequence properly, e.g., for a CoMP setting, it is possible to allow perfect or at least significantly improved RS orthogonality of Rel-11 UEs with either Rel-8/9/10/11 UE. Orthogonality is achieved both when SGH is enabled and disabled for the Rel-8/9/10 UE.

Even though FIG. 1 show only one cell 101 it is obvious for a person skilled in the art that communications network 100 could also comprise a plurality of cells 101. FIG. 1a illustrates an example where the communications network 100 comprises two cells 101 each served by a respective network node 103. A communications network 100 comprising a plurality of cells 101 could be organized in various ways as is well known in the art. The communications network 100 could, for example, be organized as a heterogeneous network or so-called hetnet with a macro cell comprising one or more pico cells. It could alternatively be organized as a homogenous network with two or more macro cells served by one or more base stations so-called macro deployment or be organized to cope with a so-called hotspot scenario where an access point serves a small area with high throughput need.

The network node 103 comprises information about a default base sequence employed by a user equipment 105 served by the cell. In some embodiments, the network node 103 comprises information about a plurality of neighbour cell default base sequences, each default base sequence being employed by respective user equipment(s) located in a respective neighbour cell. The information about the default base sequence(s) may be stored in the node 103 in the form of the actual base sequence(s), or as respective index's pointing to a table comprising the default base sequence(s). The respective default base sequence for a cell 101 is common to the cell 101, and set or configured per default in each user equipment being served by the cell 101. See for example 3GPP Technical Specification TS36.211 section 5.5 for an example of a base sequence.

Figure 4:
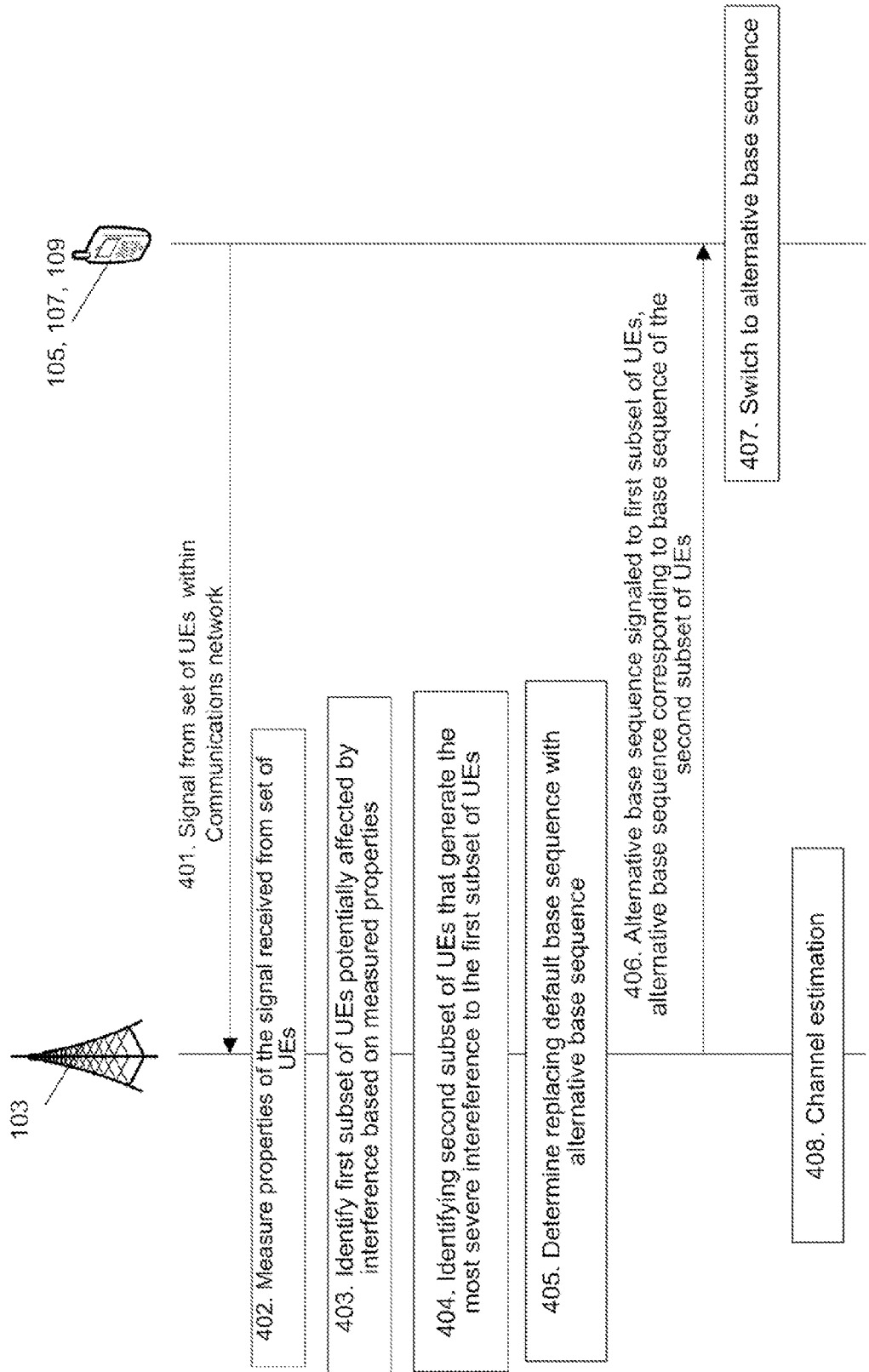
FIG. 4 is a combined signaling diagram and flow chart illustrating embodiments of a method.

FIG. 4 in a combined signaling diagram and flow chart illustrates embodiments of a method for handling base sequences in a communications network 100 comprising a network node 103 and one or more sets of UEs 105, 107, 109 in accordance with the following method steps 401-408. The communications network 100 may then comprise one or more network nodes 103 serving one or more cells 101 being neighbour cell(s) to each other, i.e. being arranged proximate to or even partly overlapping each other, where the respective sets of UEs 105, 107 and 109 may belong to the same cell 101 (shown in FIG. 1), partly same cell (FIG. 1a), or the respective sets of UEs 105, 107 and 109 may each belong to a respective different cell (not shown):

Step 401

The network node 103 receives a signal from a set of the user equipments 105, 107, 109 comprised in the communications network 100 at some of the reception points belonging to the network 100. The network node 103 may be a central scheduling unit CSU which is a scheduler controlling at least some aspects of radio resource management (RRM) for a group of coordinated cells, i.e. CoMP cluster, in the network 100. In some embodiments, the network node 103 is a base station comprising the central scheduling unit. In the following description, the term network node 103 will be used. The set of user equipments 105, 107, 109 may comprise one or more user equipments distributed in one or more cells 101 served by one or more network nodes 103.

Step 402

The network node 103 measures one or more properties of the signal received from one or more of the user equipments 105, 107, 109 within the network 100 at one or more reception points belonging to the network 100. The reception points may be associated to all or a subset of the nodes cooperating for UL CoMP. The measured properties may be e.g., DMRS power and/or sounding reference signal SRS power and/or position of the user equipments 105, 107, 109 in the cell 101.

Step 403

The network node 103 identifies a first subset of user equipment(s) 105 which is affected by strong interference. The identification of interference affected UEs 105 may be based on the measurements performed in step 402, and related to a reference signal comprised in the signal received in step 401. The first subset of user equipment(s) 105 may comprise one or more user equipments.

Step 404

The network node 103 identifies a second subset of user equipment(s) 107 that generate the most severe interference to the first subset of user equipment(s) 105 identified in step 403. The second subset of user equipments may comprise one or more user equipments. To identify the strongest or most severe interference, the network node 103 may compare the magnitude, amount or size of the measured interference with a threshold. The user equipment(s) generating interference which is above the threshold may be identified as the user equipment(s) among the second subset of user equipment(s) 107 generating the most severe interference.

Step 405

The network node 103 determines that the first subset of user equipments(s) 105 affected by the interference should be assigned an alternative base sequence. In other words, the use equipment(s) 105 affected by the interference should switch from its default base sequence to an alternative base sequence, or replace the default base sequence with an alternative base sequence. Further, SGH may also be enabled, e.g. by RRC signaling, for some or all of the user equipment(s) 105 in the first subset according to procedures described in 3GPP Technical Specification TS 36.211 sections 5.5 via a pseudo-random generator. In some embodiments, the alternative base sequence corresponds to a second base sequence, such as a second default base sequence, employed in a neighboring cell comprising the second subset of user equipment(s) 107 which is identified as interfering or which is expected to generate interference. The interference expectation could be based on previous interference measurements and/or previous positioning measurements done i.e. based on historical data.

The network node 103 comprises information about the alternative base sequence(s) e.g. the interfering neigbour cell default base sequence, and configures the alternative base sequence(s) in the user equipment(s) 105 e.g. via Radio Resource Control (RRC) signaling. In some embodiments, the network node 103 comprises information about a plurality of alternative base sequences such as base sequence(s) used as default base sequence(s) in some or all of the neighboring, i.e. surrounding, cells. The information about the alternative base sequence may be the actual base sequence, or an index of the base sequence, the index pointing to the alternative base sequence in a table comprising the alternative base sequence and possibly more alternative base sequences. The information of the one or more alternative base sequences, may be pre-stored in the network node 103 received via X2 signaling or via signaling over proprietary interfaces from neighbour cells exchanging information of their respective employed base sequence(s), which most often, but not necessarily always, is the default sequence of the respective neighbour cell. The information of the neighbour cell default base sequences, may be proprietary information pre-stored in the network node and/or may be shared between nodes over a standardized interface. For a CoMP scenario, this info is carried by the backhaul between coordinated CoMP nodes. A plurality of alternative base sequences may thus be stored and indexed in a table of the network node 103.

In some embodiments, the alternative base sequence a user equipment specific base sequence, and the default base sequence is a cell specific base sequence. A user equipment specific base sequence is a base sequence which is specific for that user equipment not only using cell specific parameters. A cell specific base sequence is a base sequence common for the cell 101 being dependent on cell specific parameter and used per default for all user equipments located in the cell 101.

As mentioned above, a reference signal, such as a DMRS and a SRS, is characterized by a group-index and a sequence-index. The reference signal is derived from a base sequence. Cyclic shift CS may be used for deriving the reference signal from the base sequence.

In prior art the base sequence used for DMRS is derived from cell specific parameters. The embodiments disclosed herein is directed at making at least some of those parameters UE-specific. CS and OCC are applied to the base sequences to derive the reference signals. The embodiments herein describe selecting and using an "alternative base sequence which includes using an alternative set of initialization parameters for deriving the base sequence.

If the network node 103 comprises information about a plurality of alternative base sequences for a plurality of user equipments 105, 107, 109, the network node 103 selects the alternative base sequence specified for the user equipment 105 or selects the index for the alternative base sequence from a set of predefined alternative base sequences made common to both the user equipment 105 and network node 103 through RRC signaling.

If multiple alternative base sequences are configured in the UE 105 by the network node 103, the node 103 may signal to the UE which one to use by signaling the index for the alternative base sequence from a set of predefined base sequences. Such index may be signaled by RRC or by scheduling grants (dynamic assignment).

In a CoMP scenario when two interfering user equipments from different interfering cells are co-scheduled on the same bandwidth, the base sequence of one of them is switched so that the alternative sequence, corresponding to the base sequence of the other user equipment, is employed. For example, when the network node 103 has received information of the base sequence used in the neighbour cell and thereby used also by the interfering user equipment 107 of that cell, the network node 103 assigns this base sequence to the interfered user equipment 105 of its cell. Thereby, the same base sequence is used for the respective user equipments 105 and 107 in the interfering cells. Neighbour cell base sequence information may for example be exchanged between the respective neighbour network nodes 103 via the X2 interface or by a proprietary interface.

Thus, when co-scheduling potentially highly interfering user equipments 105, 107 as identified at step 404 the network node 103, e.g. the central scheduling unit CSU of the network node 103, assigns the alternative base sequence so that the co-scheduled user equipments employ the same base sequence.

Orthogonality between the co-scheduled user equipments may then be achieved by applying CS and/or OCC.

If a user equipment ceases to generate and/or receive strong inter-cell interference due to changed traffic conditions and/or movement within the cell 101, its alternative base-sequence(s) may be re-configured, i.e. the alternative base sequence currently used may be updated with another alternative base sequence or with the initial default base sequence.

Step 406

The network node 103 assigns or configures by e.g. RRC signaling, to some or all of the user equipments 105 in the first subset, the alternative base sequence(s) corresponding in some embodiments to the base sequence used by the interfering second subset of user equipments 107. In other words, the network node 103 configures the user equipment(s) 105 with the selected alternative base sequence(s). The alternative sequence(s) is/are, as already mentioned, configured in the UEs 105 in a semi-static way, e.g., by Radio Resource Control (RRC) higher-layer signaling.

An indication to perform switching from the default base sequence to the alternative sequence, for a given user equipment, is either dynamically signaled as part of the scheduling information or it could also be semi-statically signaled via RRC signaling, not to be mistaken with the RRC configuring of the alternative sequence in the UE, which is a separate action and could be done in advance. However the RRC configuring and RRC indicated switching of base sequence could also be performed at the same time e.g. upon detecting an interference situation thereby saving signaling and time. The dynamically indicated switching provides the advantage that the signaling overhead required for dynamically indicating the selected base sequence is minimized and flexibility in scheduling allocation is preserved.

In some embodiments, the scheduling information might include an index field pointing to one of a subset of base sequences which have been semi-statically configured in the UE 105.

In case no alternative subcarriers are configured for a given user equipment, a base-sequence switch trigger field included in the scheduling grant may be dynamically removed or de-configured, in order to save signaling overhead. The UE then interprets DCI format for the base sequence to be used and the switch trigger field or so-called dynamic switching function is activated and/or deactivated by the network through RRC signalling when suitable, i.e. dependent on whether or not there is a need for replacing the base sequence as discussed above. The need may arise for a user equipment when e.g. moving near a cell edge due to enhanced risk of neighbour cell interference, i.e. when traffic conditions or position change.

Furthermore, when one or some alternative base-sequences are configured for a given user equipment, the switching to one out of these sequences thereof may in some embodiments be dynamically triggered by certain code points in form of data bits included in the scheduling grant corresponding to specific CS/OCC bit combinations for the DMRS. Considering that only a subset of the user equipments, and typically only cell-edge user equipments, are expected to be configured with one or more alternative base sequences, such restriction in CS/OCC assignment flexibility is acceptable.

Step 407

The user equipment 105 switches from its default base sequence to the alternative base sequence.

The embodiments herein switch the base-sequence employed by certain user equipments in a cell from the cell-specific base-sequence, e.g. default, to a UE specific base-sequence, e.g. alternative sequence. The alternative sequence index might be configured per-cell or per user equipment.

In case other DMRS parameters depend on the base sequence, e.g., the pseudo-random sequence for CS hopping and SGH, such parameters are also adjusted according to the dynamically indicated sequence.

The network node 103 may receive reference signals according to the selected alternative base sequence. Even though the configuration and/or scheduling of the alternative base sequence may be performed at one network node, such as at network node 103 the reception may be performed at some other nodes, e.g. in case of a CoMP scenario.

Step 408

The network node 103 performs channel estimation of the channel between the network node 103 and the user equipment 105 based on the alternative base sequence.

The above steps from 401 are repeated, e.g., in case new user equipments enter/exit the coordinate cells, such as in a CoMP scenario, and/or measurements in step 402 are not sufficiently updated. The steps from 401 may be repeated periodically.

Figure 5:
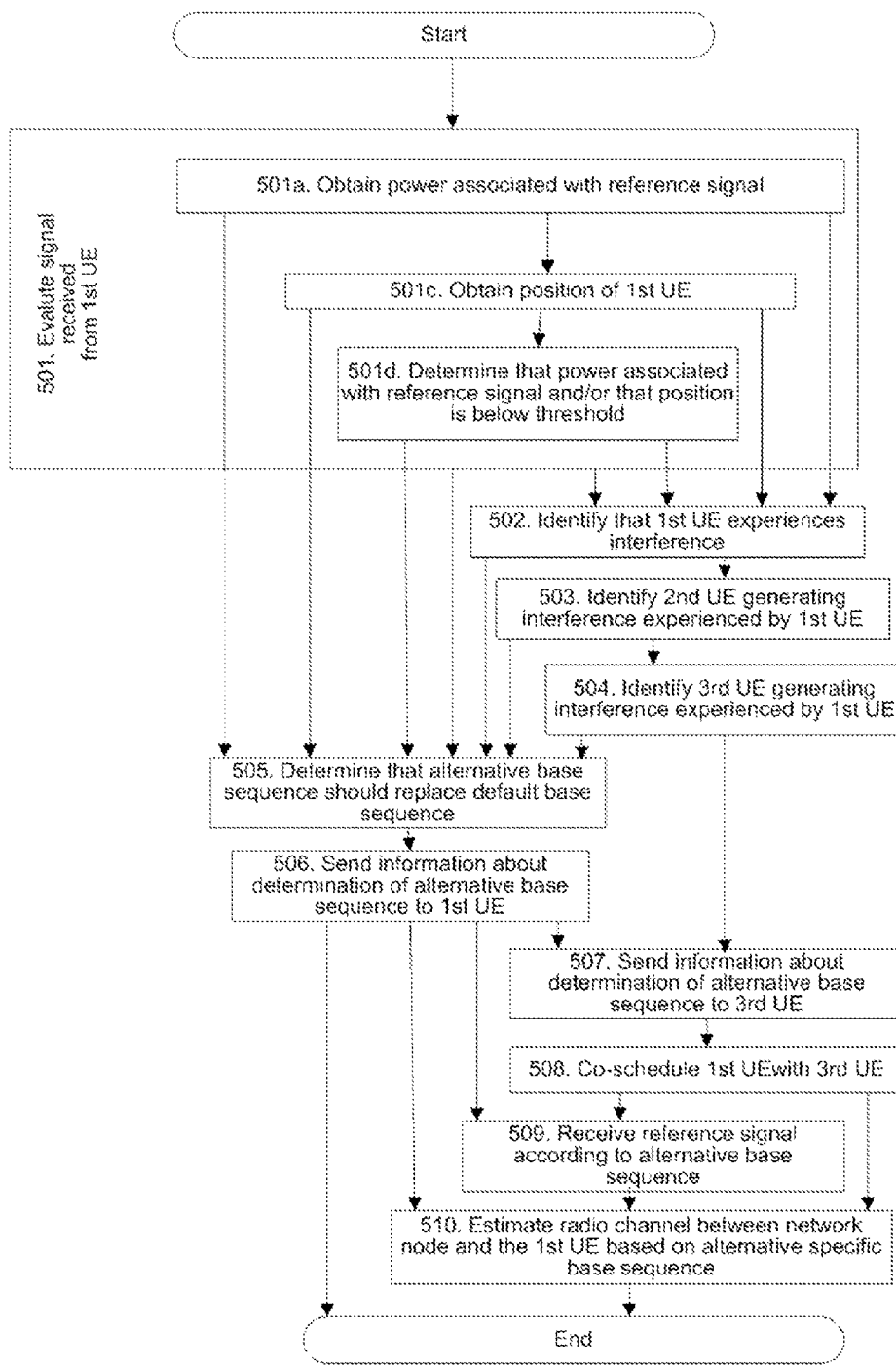
FIG. 5 is a flow chart illustrating embodiments of a method in a network node.

FIG. 5 is a flowchart describing embodiments of a method in the network node 103 for handling base sequences in a communications network 100. As mentioned above the network node 103 is configured to communicate with a first set of one or more user equipment(s) 105. In some embodiments, the network node 103 is configured to communicate with the first user equipment 105 over a radio channel 102. The network node 103 comprises information about a default base sequence and about one or more alternative base sequence(s). In some embodiments, the information about the determined alternative base sequence comprises the determined alternative base sequence or an index pointing to a table comprising the alternative base sequence. The table may be stored in a computer readable memory in the network node 103. In some embodiments, the network node 103 serves a cell 101. The network node 103 may be configured to communicate with the first user equipment 105 located in the cell 101. In some embodiments, the alternative base sequence is a user equipment specific base sequence, and the default base sequence is a cell specific base sequence.

Embodiments of the method comprise steps to be performed by the network node 103:

Step 501

This step corresponds to steps 401 and 402 in FIG. 4.

In some embodiments, the network node 103 evaluates a signal, such as a reference signal, received from the first user equipment 105.

Step 501*a*

This step corresponds to step 402 in FIG. 4, and is a sub step of step 501.

In some embodiments, the network node 103 measures a power associated with a reference signal, such as SRS or DMRS, comprised in the signal. The power is measured using any suitable measuring technique for power measurements, for example techniques known in the art for measuring reference signal received power RSRP may be used.

Step 501c

This step corresponds to step 402 in FIG. 4, and is a sub step of step 501. Step 501c is performed after step 501a, or instead of step 501a or instead of step 501a.

In some embodiments, the network node 103 obtains a position of the first user equipment 105 in the communications network 100. The network node 103 may obtain the position by using any suitable positioning measurement techniques known in the art, it may receive the position from another node(s) in the network 100, e.g. the user equipment 105 itself, or it may calculate the position using predetermined information about position or using information received from another node(s) in the network 100.

Step 501d

This step corresponds to step 402 in FIG. 4, and is a sub step of step 501. Step 501d is performed after step 501a, or after step 501c, or instead of step 501a, instead of step 501c or instead of step 501a and step 501c.

In some embodiments, the network node 103 determines that the power associated with a reference signal, such as a demodulation reference signal DMRS or a sounding reference signal SRS, and/or the user equipment position is below or within a respective threshold. This may be done by comparing the power associated with the reference signal and/or by comparing the position of the user equipment with the respective threshold. The respective threshold may be of any suitable size and may comprise any of a RS power metric, a distance to cell edge or geographic boundary metric.

Step 502

This step corresponds to step 403 and step 404 in FIG. 4.

In some embodiments, based on the evaluated signal, the network node 103 identifies that the first user equipment 105 experiences interference in the communications network 100.

Step 503

This step corresponds to step 403 and 404 in FIG. 4.

In some embodiments, based on the evaluated signal, the network node 103 identifies a second user equipment 107 generating the interference experienced by the first user equipment 105. The second user equipment 107 employs a second base sequence, and the alternative base sequence corresponds to the second base sequence.

Step 504

This step corresponds to steps 403 and 404 in FIG. 4.

In some embodiments, based on the evaluated signal, the network node 103 identifies a third user equipment 109 generating the interference experienced by the first user equipment 105.

Step 505

This step corresponds to step 405 in FIG. 4.

The network node 103 determines, for the first user equipment 105, that the alternative base sequence should replace the default base sequence.

In some embodiments, the step of determining that the alternative base sequence should replace the default base sequence is based on information about interference experienced by the user equipment 105.

In some embodiments, the step of determining that the alternative base sequence should replace the default base sequence is based on the interference identified in step 502.

Step 506

This step corresponds to step 406 in FIG. 4.

The network node 103 sends information about the determined alternative base sequence to the first user equipment 105.

In some embodiments, the information about the alternative base sequence is sent to the first user equipment 105 via scheduling information.

Step 507

This step corresponds to step 406 in FIG. 4.

In some embodiments, the network node 103 sends information to the third user equipment 109 about the determined alternative base sequence, which alternative base sequence corresponds to the second base sequence.

Step 508

In some embodiments, the network node 103 co-schedules the first user equipment 105 with the third user equipment 109. In case the first and third user equipment 105 and 109 are located in the same cell 101, this could e.g. be for a MU-MIMO scenario.

Step 509

In some embodiments, the network node 103 receives, from the user equipment 105, a reference signal according to the alternative base sequence.

Step 510

In some embodiments, the network node 103 estimates the radio channel 102 between the network node 103 and the first user equipment 105 based on the alternative specific base sequence.

Figure 6:
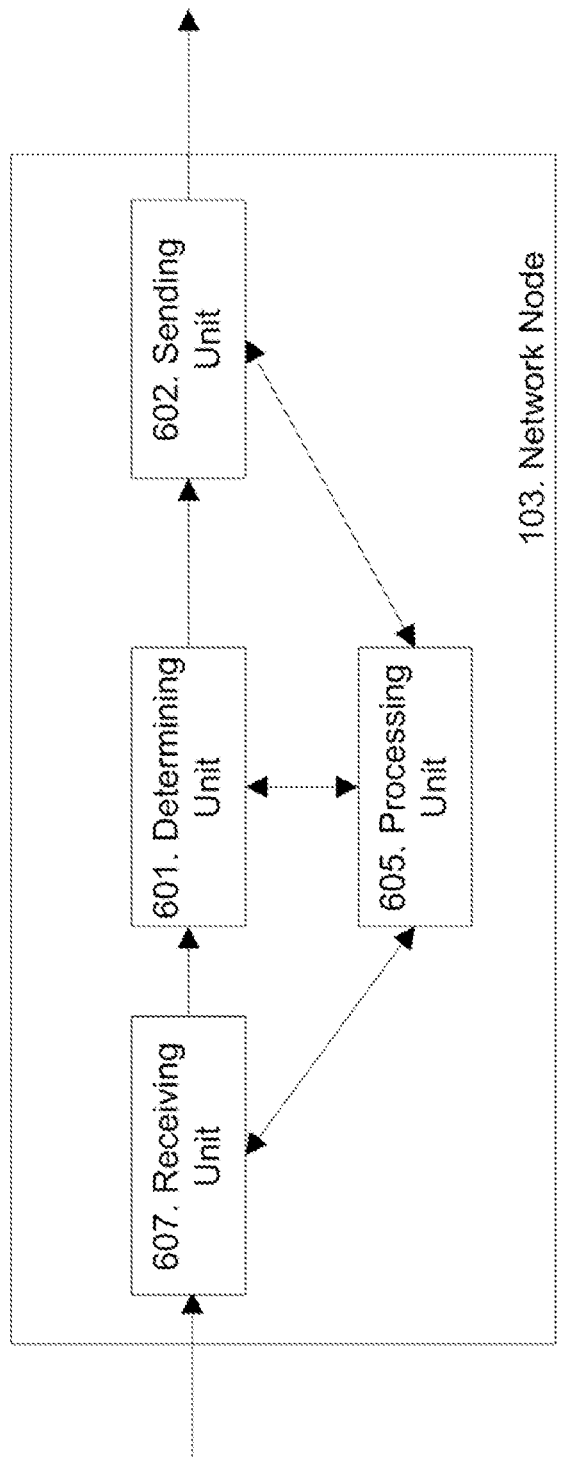
FIG. 6 is a schematic block diagram illustrating embodiments of a network node.
Figure 9:
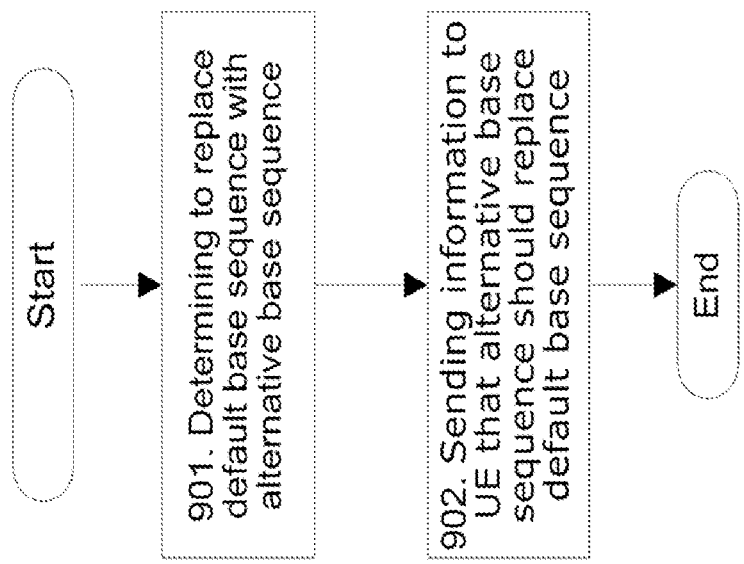
FIG. 9 is a flow chart illustrating embodiments of a method in a network node.

To perform method steps of embodiments shown in FIGS. 5 and 9 for handling base sequences in a communications network 100, the network node 103 comprises an arrangement as shown in FIG. 6. The network node 103 is configured to communicate with a first user equipment 105. In some embodiments, the network node 103 is configured to communicate with the first user equipment 105 over a radio channel 102. As mentioned above, the network node 103 comprises information about a default base sequence and an alternative base sequence. In some embodiments, the network node 103 serves a cell 101. The network node 103 is configured to communicate with the first user equipment 105 in the cell 101. In some embodiments, the alternative base sequence is a user equipment specific base sequence, and the default base sequence is a cell specific base sequence.

The network node 103 comprises a determining unit 601 configured to determine, for the first user equipment 105, that the alternative base sequence should replace the default base sequence. In some embodiments, the determining unit 601 is further configured to determine that the alternative base sequence should replace the default base sequence based on information about interference experienced by the user equipment 105. In some embodiments, the determining unit 601 is further configured to determine that the alternative base sequence should replace the default base sequence based on the identified interference.

The network node 103 further comprises a sending unit 602 configured to send information about the determined alternative base sequence to the first user equipment 105. In some embodiments, the sending unit 602 is configured to send the information about the alternative base sequence to the first user equipment 105 via scheduling information. In some embodiments, the sending unit 602 is configured to send information to the third user equipment 109 about the determined alternative base sequence. The alternative base sequence corresponds to the second base sequence. In some embodiments, the information about the determined alternative base sequence comprises the determined alternative base sequence or an index pointing to a table comprising the alternative base sequence.

In some embodiments, the network node 103 further comprises a processing unit 605. In some embodiments, the processing unit 605 is configured to evaluate a signal received from the first user equipment 105. The processing unit 605 may be further configured to, based on the evaluated signal, identify that the first user equipment 105 experiences interference in the communications network 100. In some embodiments, the processing unit 605 is further configured to, based on the evaluated signal, identify a second user equipment 107 generating the interference experienced by the first user equipment 105. The second user equipment 107 may employ a second base sequence, and the alternative base sequence may correspond to the second base sequence.

In some embodiments, the processing unit 605 is further configured to measure a power associated with a reference signal comprised in the signal, and/or measure a power associated with a sounding reference signal, referred to as SRS, comprised in the signal; and/or obtain a position of the first user equipment 105 in the communications network 100. The processing unit 605 may be further configured to determine that the power associated with a reference signal, such as SRS or DMRS, and/or that the position is below a threshold.

In some embodiments, the processing unit 605 is configured to, based on the evaluated signal, identify a third user equipment 109 generating the interference experienced by the first user equipment 105. The processing unit 605 may be configured to co-schedule the first user equipment 105 with the third user equipment 109.

In some embodiments, the processing unit 605 is configured to estimate the radio channel 101 between the network node 103 and the first user equipment 105 based on the alternative specific base sequence.

In some embodiments, the network node 103 comprises a receiving unit 607 configured to receive, from the user equipment 105, a reference signal according to the alternative base sequence.

Figure 7:
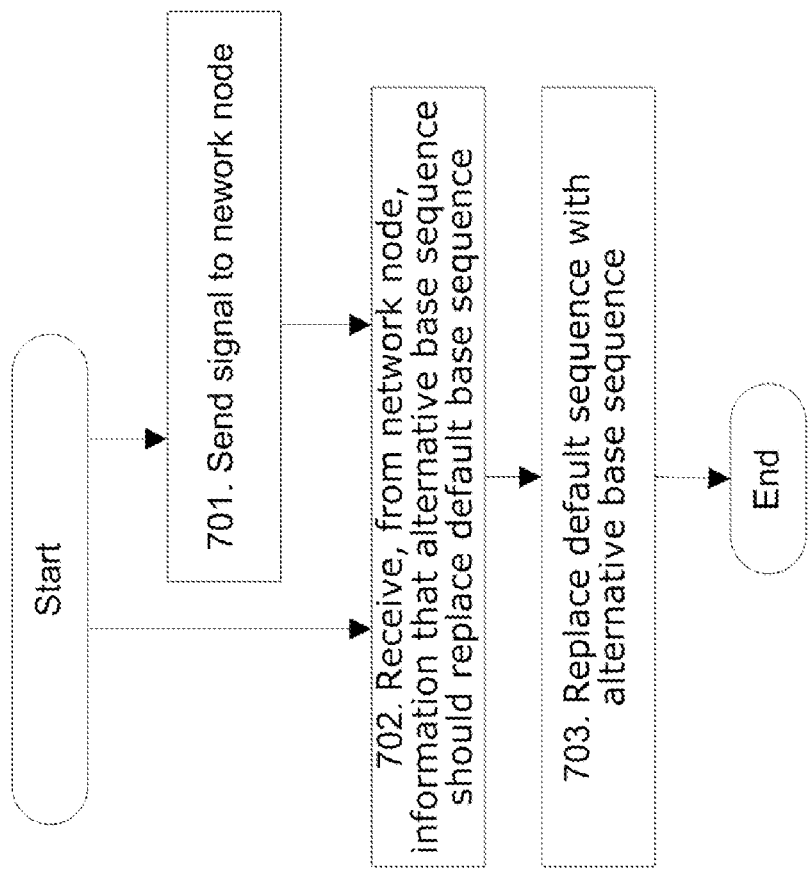
FIG. 7 is a flow chart illustrating embodiments of a method in a user equipment.

The method described above will now be described seen from the perspective of the user equipment 105. FIG. 7 is a flowchart describing embodiments of the method in the user equipment 105, for handling base sequences in a communications network 100. As mentioned above the first user equipment 105 is configured to communicate with a network node 103. The first user equipment 105 employs a default base sequence. In some embodiments, the user equipment 105 is located in a cell 101. The cell 101 is served by the network node 103. As mentioned above, in some embodiments, the alternative base sequence is a user equipment specific base sequence, and the default base sequence is a cell specific base sequence. In some embodiments, information about one or more alternative base sequence(s) is (are) dynamically or semi-statically received from the network node 103. The method comprises the steps to be performed by the user equipment 105:

Step 701

This step corresponds to step 401 in FIG. 4.

In some embodiments, the user equipment 105 sends a signal to the network node 103.

Step 702

This step corresponds to step 406 in FIG. 4.

The user equipment 105 receives, from the network node 103, information that an alternative base sequence should replace the default base sequence. By replacing, it is meant that the user equipment should employ the alternative base sequence instead of the default base sequence. In some embodiments, replacing means that the alternative base sequence overrides the default base sequence.

Step 703

The user equipment 105 replaces the default sequence with the alternative base sequence. Thus, the user equipment 105 now employs the alternative base sequence instead of the default base sequence.

Figure 8:
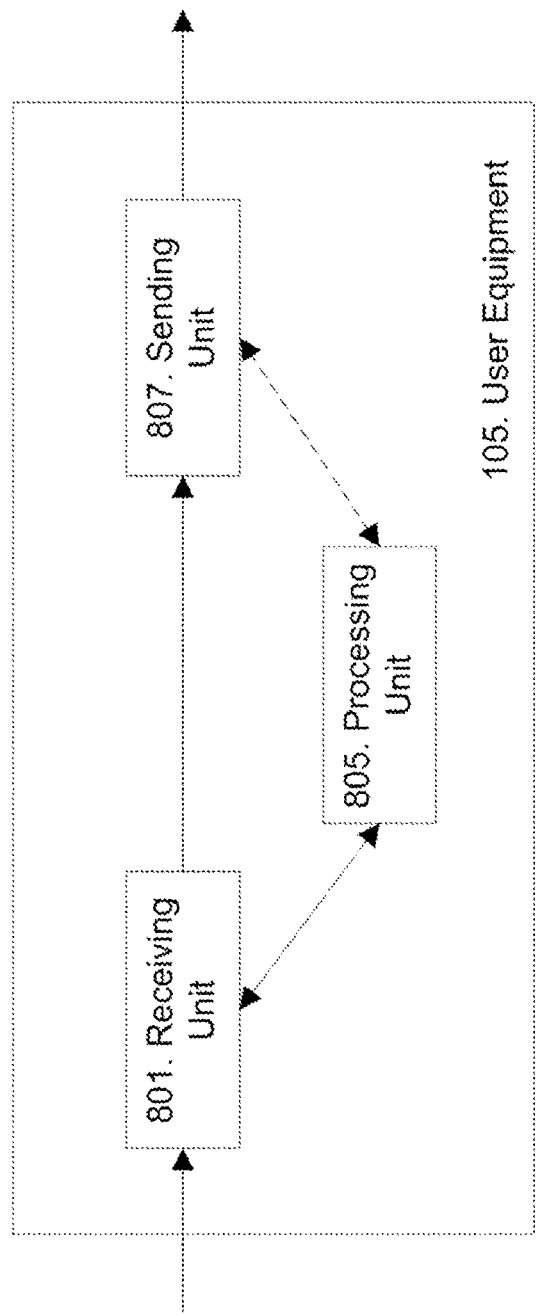
FIG. 8 is a schematic block diagram illustrating embodiments of a user equipment.

To perform method steps of embodiments shown in FIGS. 7 and 10 for handling base sequences in a communications network 100, the user equipment 105 comprises an arrangement as shown in FIG. 8. The user equipment 105 is configured to communicate with a network node 103. The user equipment 105 employs a default base sequence. In some embodiments, the user equipment 105 is located in a cell 101. The cell 101 is served by the network node 103.

The user equipment 105 comprises a receiving unit 801 configured to receive, from the network node 103, information that an alternative base sequence should replace the default base sequence. In some embodiments, the information about alternative base sequence is dynamically received from the network node 103.

In some embodiments, the alternative base sequence is a user equipment specific base sequence, and the default base sequence is a cell specific base sequence.

The user equipment 105 further comprises a processing unit 805 configured to replace the default sequence with the alternative base sequence.

In some embodiments, the user equipment 105 comprises a sending unit 807 configured to send a signal to the network node 103.

FIG. 9 is a flowchart describing further embodiments of a method in the network node 103 for handling base sequences in a communications network 100. As mentioned above the network node 103 is configured to communicate with a set of one or more first user equipment 105(s). The network node 103 serves a cell 101 and is configured to communicate with the first user equipment 105 located in the cell 101 over a radio channel 102. The network node 103 comprises information about a default base sequence and about one or more alternative base sequence(s). In some embodiments, the information about the alternative base sequence comprises the alternative base sequence or an index pointing to a table comprising the alternative base sequence. The table may be stored in a computer readable memory in the network node 103. In some embodiments, the alternative base sequence is a user equipment specific base sequence, and the default base sequence is a cell specific base sequence. In some embodiments the information about one or more alternative base sequences have been received signalled from one or more neighbour cells, e.g. over an X2 interface or proprietary interface. The network node 103 may further in some embodiments configure the first user equipment 105 with the one or more alternative base sequences via higher layer signalling, for example via radio resource control, (RRC) signalling. In some embodiments, the network node 103 evaluates a signal received from the first user equipment 105. The configuring of alternative base sequences in the first UE 105 may in some embodiments be initiated by the network node 103 upon detecting an actual interference or interference potential for the first UE 105 when evaluating the received signal or the configuring may be done per default for each user equipment when entering the serving cell.

The method embodiments comprise steps 901 and 902 to be performed by the network node 103:

Step 901

The network node 103 determines to replace the default base sequence which is cell specific with the alternative base sequence.

In some embodiments the alternative base sequence is UE specific such that only select one or more UEs 105 in the cell 101, but not all UEs in the cell, is configured with the alternative base sequence whilst the remaining UEs of the cell still employ the default base sequence. Even if more than one UE of the cell employs the same alternative sequence this sequence is still UE specific since it is not dependent on cell specific parameters of the serving cell, which is the case for the cell specific default sequence.

The determining may in some embodiments be based on that the first user equipment 105 experiences interference in the communications network 100.

The determining may in certain embodiments be based on that the first user equipment 105 is determined to have a likelihood or potential of experiencing interference in the communications network 100. This potential or likelihood may according to some embodiments be determined by establishing the position of the UE 105 in relation to a neighbour cell comprising interfering or possibly interfering UEs, such as the second and/or third sets of UEs 107, 109. Historical interference data may also or alternatively be used by the network node 103 to establish interference likelihood or probability based on knowledge of the position of the first UE 105, i.e. based on the interference history statistics for previous UEs of a position or area.

Step 902

The network 103 sends information to the first UE 105 that the alternative base sequence should replace the default base sequence.

The sending of information may in some embodiments comprise including the information in a scheduling transmission, such as in a scheduling grant signaling, or signaling the information via RRC. The actual alternative base sequence or the index of the base sequence may then be included in the scheduling transmission or in the RRC transmission. The index is pointing to the alternative sequence in a table of one or more alternative base sequences having been previously configured in the first UE 105 by the network node 103.

In some embodiments, a switch trigger field is included in the scheduling information being signaled or transmitted, for triggering i.e. activating the switching or replacing of the default base sequence with the alternative sequence. The switching may then be dynamically triggered by including certain code points in the form of data bits in this field of the scheduling grant corresponding to specific CS/OCC combinations for the DMRS.

FIG. 10 is a flowchart describing further embodiments of a method in the user equipment 105, for handling base sequences in a communications network 100. As mentioned above the first user equipment 105 is configured to communicate with a network node 103. The first user equipment 105 employs a default base sequence and is located in a cell 101 being served by the network node 103. In some embodiments, the first UE 105 is configured with one or more alternative base sequences via higher layer signalling, for example via radio resource control, (RRC) signalling. The configuring of alternative base sequences in the first UE 105 may then in some embodiments be dynamically initiated by the network node 103 upon detecting an actual interference or interference potential for the first UE 105 when evaluating the received signal. In some embodiments, a signal is sent to the network node 103 for evaluation.

The embodiments of the method comprise the steps 1001 and 1002 to be performed by the user equipment 105:

Step 1001

The user equipment 105 receives, from the network node 103, information that one of an alternative base sequence should replace the default base sequence. By replacing, it is meant that the user equipment should employ the alternative base sequence instead of the default base sequence. In some embodiments, replacing means that the alternative base sequence overrides the default base sequence.

The information to replace the default base sequence with the alternative base sequence is in some embodiments signaled in a scheduling grant or via RRC from the network node 103.

Step 1002

The user equipment 105 replaces the default sequence with the alternative base sequence. Thus, the user equipment 105 employs the alternative base sequence instead of the default base sequence.

The present mechanism for handling base sequences in a communications network 100 may be implemented through one or more processors, such as the processing unit 805 in the user equipment 105 depicted in FIG. 8 and the processing unit 605 in the network node 103 depicted in FIG. 6, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the user equipment 105 and/or network node 103. One such carrier may be in the form of a CD ROM disc. It is however feasible with other data carriers such as a memory stick. The computer program code may furthermore be provided as pure program code on a server and downloaded to the user equipment 105 and/or network node 103 remotely.

Note that although terminology from 3GPP LTE-Advanced has been used in this disclosure to exemplify the embodiments herein, this should not be seen as limiting the scope of the embodiments herein to only the aforementioned system. Other wireless systems, comprising WCDMA, Worldwide Interoperability for Microwave Access (WiMax), Ultra Mobile Broadband (UMB) and GSM, may also benefit from exploiting the ideas covered within this disclosure.

Also note that terminology such as base station and UE should be considering non-limiting and does in particular not imply a certain hierarchical relation between the two; in general "base station" could be considered as device 1 and "UE" device 2, and these two devices communicate with each other over some radio channel.

The embodiments herein are not limited to the above described preferred embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method in a network node for handling base sequences in a communication network, the network node being configured to communicate with a first user equipment, the network node comprising information about a default base sequence and an alternative base sequence, the method comprising:
   determining, for the first user equipment, that the alternative base sequence should replace the default base sequence; and
   sending information about the determined alternative base sequence to the first user equipment,
   wherein the information about the alternative base sequence is sent to the first user equipment via scheduling information or via radio resource control (RRC) signalling, in a scheduling grant, and includes:
   code points in a form of data bit values corresponding to specific cyclic shift/orthogonal cover code (CS/OCC) combinations for a demodulation reference signal (DMRS),
   an index of the alternative base sequence, or
   the alternative base sequence.

2. The method of claim 1, wherein determining that the alternative base sequence should replace the default base sequence is based on information about interference experienced by the user equipment or based on information about a probability of the user equipment experiencing interference.

3. The method of claim 1, further comprising:
   evaluating a signal received from the first user equipment; and
   based on the evaluated signal, identifying that the first user equipment experiences interference in the communication network;
   wherein determining that the alternative base sequence should replace the default base sequence is based on the identified interference.

4. The method of claim 3, further comprising:
   based on the evaluated signal, identifying a second user equipment generating the interference experienced by the first user equipment, which second user equipment employs a second base sequence, and which second base sequence is assigned as the alternative base sequence.

5. The method of claim 3, wherein evaluating the signal further comprises:
   measuring a power associated with a reference signal comprised in the signal;
   obtaining a position of the first user equipment in the communication network; and
   determining that the power associated with the reference signal and/or that the position is below a respective threshold.

6. The method of claim 4, further comprising:
   based on the evaluated signal, identifying a third user equipment generating interference experienced by the first user equipment;
   sending information to the third user equipment about the determined alternative base sequence, which alternative base sequence corresponds to the second base sequence; and
   co-scheduling the first user equipment with the third user equipment.

7. The method of claim 1, wherein the network node is configured to communicate with the first user equipment over a radio channel, and the method further comprises:
   estimating the radio channel between the network node and the first user equipment based on the alternative specific base sequence.

8. The method of claim 1, wherein the information about the determined alternative base sequence comprises the determined alternative base sequence or an index pointing to a table comprising the alternative base sequence.

9. The method of claim 1, wherein the network node serves a cell and is configured to communicate with the first user equipment in the cell; the alternative base sequence is a user-equipment-specific base sequence; and the default base sequence is a cell-specific base sequence.

10. The method of claim 1, further comprising receiving, from the user equipment, a reference signal according to the alternative base sequence.

11. The method of claim 1, wherein sending information about the determined alternative base sequence to the first user equipment comprises configuring the user equipment with the alternative base sequence via radio resource control (RRC) signaling.

12. A method in a first user equipment for handling base sequences in a communication network, the first user equipment being configured to communicate with a network node and the first user equipment employing a default base sequence, the method comprising:
   receiving, from the network node, information that an alternative base sequence should replace the default base sequence; and
   replacing the default sequence with the alternative base sequence
   wherein the information about the alternative base sequence triggering the replacing of the default base sequence with the alternative sequence is received in a scheduling grant from the network node, the information including:
   code points in a form of data bits corresponding to specific cyclic shift/orthogonal cover code (CS/OCC) combinations for a demodulation reference signal (DMRS),
   an index of the alternative base sequence, or
   the alternative base sequence.

13. The method of claim 12, further comprising sending a signal to the network node for evaluating interference or interference probability.

14. The method of claim 12, wherein the user equipment is located in a cell, the cell is served by the network node, the alternative base sequence is a user-equipment-specific base sequence, and the default base sequence is a cell-specific base sequence.

15. The method of claim 12, wherein receiving information about the alternative base sequence comprises receiving the alternative base sequence in a radio resource control (RRC) configuration being signalled from the network node.

16. A network node for handling base sequences in a communication network, the network node being configured to communicate with a first user equipment and comprising information about a default base sequence and an alternative base sequence, the network node further comprising:
   a determining unit configured to determine, for the first user equipment, that the alternative base sequence should replace the default base sequence; and
   a sending unit configured to send information about the determined alternative base sequence to the first user equipment
   wherein the sensing unit send the information about the alternative base sequence to the first user equipment via scheduling information or via radio resource control (RRC) signalling, in a scheduling grant, and the information includes:

code points in a form of data bit values corresponding to specific cyclic shift/orthogonal cover code (CS/OCC) combinations for a demodulation reference signal (DMRS), an index of the alternative base sequence, or the alternative base sequence.

17. A user equipment for handling base sequences in a communication network, the user equipment being configured to communicate with a network node and employing a default base sequence, the user equipment comprising:
 a receiving unit configured to receive, from the network node, information that an alternative base sequence should replace the default base sequence; and
 a processing unit configured to replace the default sequence with the alternative base sequence,
 wherein the information about the alternative base sequence triggering the processing unit to replace the default base sequence with the alternative sequence is received in a scheduling grant from the network node, the information including:
 code points in a form of data bits corresponding to specific cyclic shift/orthogonal cover code (CS/OCC) combinations for a demodulation reference signal (DMRS),
 an index of the alternative base sequence, or
 the alternative base sequence.

* * * * *